Patented Oct. 19, 1926.

1,603,314

UNITED STATES PATENT OFFICE.

LYLE CALDWELL, OF LOS ANGELES, CALIFORNIA, ASSIGNOR TO THE CELITE COMPANY, OF LOS ANGELES, CALIFORNIA, A CORPORATION OF DELAWARE.

PROCESS OF TREATING LIQUIDS.

No Drawing. Application filed October 12, 1925. Serial No. 62,139.

My invention relates to the art of clarifying, purifying, neutralizing, and improving the color of petroleum products, vegetable, animal, or marine oils; and similar liquids; waxes, gums, and similar substances; and is a novel process for treating oleaginous liquids or substances.

The invention in brief consists in bringing such liquids or substances into intimate contact with a finely divided lime-treated silica, and thereafter separating such treated silica from the liquid.

The invention more specifically refers to treatment of unrefined or partly refined petroleum oils or distillates such as gasoline, kerosene, naphtha, lubricating cuts, etc., to remove the objectionable gums, sulphur compounds, unsaturated olefines, water, and other impurities contained therein.

Specifically the invention consists in a novel process of treating petroleum oils with an acid, substantially removing said acid, bringing the treated oil into contact with a lime-treated and preferably calcined diatomaceous earth product, separating such diatomaceous earth product from the oil, and finally washing the so treated oil with water.

I will hereinafter explain the invention more fully and refer to the claims for summaries of the invention for which protection is desired.

Many unrefined oils, waxes, and gums contain deleterious substances which are objectionable in the finished product. Heretofore such impurities have been removed from petroleum products by various refining processes, such as acid and alkaline treatments, subsequent distillation, and by various other chemical and filtering processes.

The objectionable impurities in a petroleum product are most frequently sulphur compounds, and it has recently been determined that some of these compounds may be removed by a so-called adsorbing process, in which some of the objectionable constituents in the petroleum product are adsorbed or condensed upon the surfaces of an adsorption agent, such as fuller's earth, clay, decolorizing agent, and the like, introduced into the petroleum product. In such adsorbing process two important conditions are time of contact and area of surface presented by the adsorbing agent to contact with the petroleum product. For instance, with a given weight of adsorbing agent, the finer the comminution of such agent the greater will be its surface area and the greater will be its effect in removing impurities from a petroleum product into which it has been introduced.

Heretofore, also, partly refined petroleum products such as kerosene or gasoline, have been treated with a "doctor" or sodium plumbite solution, usually following an acid treatment. After this "doctor" solution has been settled and drawn off, flowers of sulphur are added and the excess plumbite precipitated as lead sulphide.

My process of treating liquids, and particularly petroleum products, is simpler, quicker, more economical and just as effective as the involved and comparatively expensive treatments now known in the art; and while most of the known processes are only "batch" processes my process can be operated continuously, or semi-continuously.

According to my invention in its preferred form, the liquid from which it is desired to remove objectionable compounds, for example gasoline, is first given a treatment consisting in admixing or agitating with an acid, such as sulphuric or hydrochloric acid, or hydrochloric acid gas, and the acid partly or wholly settled out or removed by other suitable means.

A dry adsorbing agent consisting of a finely divided lime-treated silica (preferably produced by the method hereinafter explained), is then introduced into the liquid and agitated by any suitable means to insure thorough contact of the liquid with such silica, and after treatment such silica is separated from or removed from the liquid by decanting, filtering, or other suitable means. The treated liquid may then be washed with water to remove any of the traces of alkali or impurities which were not taken out by the acid or adsorbing agent.

A finely divided lime treated silica suitable for the purpose of my invention may be produced from any finely divided silica, such as pulverized sand or quartz, but preferably diatomaceous earth (otherwise known as infusorial earth, tripoli, diatomite, keiselguhr, or fossil flour) by treating a water suspension of such finely ground powdered silica with lime, or with any other alkaline earth or combination thereof, at temperatures near the boiling point, whereby a reaction takes place and produces a mass of hydrated calcium silicate. When lime is used, the product is a hydrated monocalcium silicate, provided sufficient lime was added to combine with all of the silica present in the diatomaceous earth. When the product is dried a very finely divided, dry material suitable for the purpose of my invention is produced. After the lime treatment, as described, the lime-treated silica may be calcined at a high temperature to enhance its efficiency.

One method which may be used in making the lime-treated silica used in my process is as follows. Sixty pounds of finely divided silica, for instance diatomaceous earth, is mixed with sufficient water to form a suspension; about 500 lbs. of water being ample. This suspension is preferably heated to boiling, or it may be merely warmed. About 56 lbs. of fresh quicklime is then added and the entire mixture agitated by suitable mechanical means. The heat of slaking is generally sufficient to keep the temperature sufficiently high for the reaction to take place; if not, sufficient heat should be supplied to keep the temperature at about the boiling point. After reaction, or when substantially all the lime has combined with the silica to form a hydrated lime silicate, the excess water is removed from the mass by filtration or other suitable means. If not then sufficiently dry, the partly dried material may be dried still further; and it may be calcined in a suitable furnace or oven at a temperature of from 1000° F. to 1600° F., all of the water of hydration being driven off during such calcination. The products which result from such treatments are in an exceedingly fine state of division.

In the above illustration 60 lbs. of silica is used to 56 lbs. of lime, and theoretically this is required to form $CaSiO_3$; but larger or smaller quantities of lime may also be used depending upon the activity of the product desired. Magnesite, barytes, etc., may also be used, although lime appears to be most effective and economical.

If an oil which has been treated with acid, or an oil or distillate which shows an acid reaction, is brought into intimate contact with such lime-treated silica, there is a distinct neutralizing action due to the reaction between the alkaline constituents of the lime treated silica and the acid compounds in the oil. Furthermore, the porous nature of the lime treated silica acts as an absorbent or adsorbent for the acid or other aqueous liquids and impurities present in the oil being treated.

In some instances it may not be necessary to employ the acid treatment; for example, "topped" gasoline may not require acid treatment, but "cracked" gasoline contains impurities which require acid treatment. When the acid treatment is not necessary the petroleum product may be simply treated with the above described lime-treated silica adsorbing agent, by effecting a thorough intimate contact between such agent and the petroleum product, said agent being then removed from the liquid in any suitable manner. The resultant petroleum product if then sufficiently purified may be marketable; or if not it may be washed with water to remove any alkali, or impurities still remaining in the product.

The liquid to be treated, either after having been subjected to previous acid treatment or without such treatment, may be percolated through a bed of the aforedescribed lime-treated adsorbing agent and result in a satisfactory product.

In a majority of instances it is advantageous to maintain the liquid during its treatment at as high a temperature as is consistent with the type of oil which is being treated, that is, at a temperature which is not high enough to vaporize or oxidize any of the constituents of the oil, but sufficiently high to reduce the viscosity or accelerate the purifying action.

Although in the majority of cases it is unnecessary to do so, in some instances the mixture of oil and treating agent may be subjected to pressure to enhance the efficiency of the lime treated silica or diatomaceous earth, or to obtain a better resultant oil product.

It has been found that a finely divided lime-treated silica or diatomaceous earth as previously described, when used in the method stated with petroleum distillates, such as gasolines, naphthas, benzines, etc., will completely remove sulphur compounds and gum-forming constituents which are normally discovered in the finished petroleum product by such tests as the "doctor" and "copper corrosion" tests and by the so-called "gumming" test. It has been possible with the use of such lime-treated diatomaceous earth to remove such sulphur compounds and gum forming constituents and to decolorize, as well as deodorize, distillates from petroleum crudes, such as obtained from the Santa Maria, Purissima, and Summerland fields of California, some of which crudes contain up to 4% sulphur in some form and are difficult to treat. Many of the distilled products of these petroleum crude oils are badly off color, possess an obnoxious odor and contain a proportionately large amount of gum-forming constituents as determined by the tests mentioned.

The following is one example of the practical utility of my process. Sulphuric acid may be added to a petroleum distillate, such as gasoline, in amounts varying from 2 to 10 lbs. of concentrated acid per barrel of distillate, the mixture mechanically agitated for sufficient time to effect a thorough contact of the acid with the gasoline (two hours in most cases being more than ample for such operation) and the sludge which has been formed by the acid may then be allowed to settle out of the gasoline. When the greater part or all of this sludge has settled out, the gasoline may be drawn off, run into a clean or separate tank and lime-treated diatomaceous earth (such as described) added to the gasoline in amounts sufficient to neutralize the gasoline and to remove the objectionable constituents of the gasoline. The amount of the lime-treated diatomaceous earth necessary to produce a marketable and suitable product, in this instance, gasoline, may vary from 0.1 to 5 lbs. per bbl. of gasoline treated. The mixture of gasoline and the lime-treated diatomaceous earth may then be mechanically or otherwise agitated to insure intimate and thorough contact of the treating agent with the gasoline. The mixture of the lime-treated diatomaceous earth and gasoline may be run to a filter press where the treating agent is retained in the form of a cake and the gasoline is forced through said cake, emerging from the press as a water-white and clear product. If necessary to do so the gasoline may then be treated with water, as known in the art, to wash out any traces of alkali or other substances.

By introducing the treating agent in small quantities into the oil while the oil is being pumped from a prior treating chamber or other source to the filter press or other separating means, the process of adding the lime-treated diatomaceous earth to the oil and the separation of such lime-treated earth from the oil, can be made continuous, the term "lime-treated diatomaceous earth" referring to the product obtained in substantially the manner disclosed herein. Inasmuch as the length of filtration cycle depends on the cake space or volume of agent which may be retained in a filter press, two or more filter presses may be provided and the flow directed from one filter to the other whenever required without disturbing the operation.

It is understood that the foregoing example is illustrative only and that the invention is not limited to the exact procedure, proportions or materials mentioned therein, except in so far as the limitations may be included within the terms of the accompanying claims.

I claim:—

1. The process of treating oleaginous liquids consisting in bringing such a liquid into contact with a finely divided lime-treated silica, and then separating such silica from the liquid.

2. In the process of treating oleaginous liquids, the step of bringing such a liquid in contact with a finely divided silica previously treated with an alkaline earth and then separating the liquid from such treated silica.

3. The process of treating oleaginous liquids consisting in bringing such liquid into intimate contact with a substantially dry finely divided silica lime-treated and then calcined; and then separating such silica from the liquid.

4. In the process of treating oleaginous liquids, the step of bringing the liquid to be treated into intimate contact with a finely divided silica previously treated with an alkaline earth and then calcined, and then separating the liquid from such treated silica.

5. The process of treating oleaginous liquids consisting in bringing such a liquid into intimate contact with a substantially dry lime-treated diatomaceous earth, and then separating such treated earth from the liquid.

6. A process for treating oils consisting in bringing the oil into intimate contact with a lime-treated diatomaceous earth product, and then removing the lime-treated diatomaceous earth product from the oil.

7. A process for treating oils consisting in bringing the oil into contact with a lime-treated diatomaceous earth product, removing the lime-treated diatomaceous earth product from the oil and washing the separated oil with water.

8. In an acid process for treating petroleum oils, the steps of treating the oil with a lime-treated diatomaceous earth, and then removing such lime-treated diatomaceous earth from the treated oil; the oil being subjected to said steps subsequent to the treatment of the oil with acid.

9. A process for treating petroleum oil consisting in treating the oil with acid, substantially removing said acid, bringing the treated oil into contact with a lime-treated diatomaceous earth product, and then finally separating the diatomaceous earth product from the oil.

10. A process for treating petroleum oil consisting in treating the oil with acid, substantially removing said acid, bringing the treated oil into contact with a lime-treated diatomaceous earth product, separating said diatomaceous earth product from the oil, and finally washing the oil with water.

11. A process for treating petroleum oil consisting in treating the oil with acid, bringing the mixture of oil and acid into contact with a lime-treated diatomaceous earth product, and then removing the diatomaceous earth product.

12. A process for treating oils consisting in bringing the oil into intimate contact with a lime-treated and calcined diatomaceous earth product; and then removing the lime-treated diatomaceous earth product from the oil.

13. In an acid process for treating petroleum oils, the steps of treating the oil with a lime-treated and calcined diatomaceous earth and then removing such lime-treated diatomaceous earth from the treated oil; the oil being subjected to said steps subsequent to the treatment of the oil with acid.

14. A process for treating petroleum oil, consisting in treating the oil with acid, substantially removing said acid, bringing the treated oil into contact with a lime-treated and calcined diatomaceous earth product, and then finally separating the diatomaceous earth product from the oil.

15. A process for treating petroleum oil, consisting in treating the oil with acid, substantially removing said acid, bringing the treated oil into contact with a lime-treated and calcined diatomaceous earth product, separating said diatomaceous earth product from the oil, and finally washing the oil with water.

In testimony that I claim the foregoing as my own, I affix my signature.

LYLE CALDWELL.